INVENTOR.
William H. Middendorf
BY
Wood, Herron & Evans
ATTORNEYS

INVENTOR.
William H. Middendorf
BY
Wood, Herron and Evans
ATTORNEYS

Nov. 3, 1970 W. H. MIDDENDORF 3,538,467

MAGNETIC CIRCUIT DEVICE EMBODYING THERMOMAGNETIC CIRCUIT ELEMENT

Filed Oct. 17, 1968 3 Sheets-Sheet 3

INVENTOR
William H. Middendorf
BY
Wood, Herron and Evans
ATTORNEYS

United States Patent Office 3,538,467
Patented Nov. 3, 1970

3,538,467

MAGNETIC CIRCUIT DEVICE EMBODYING THERMOMAGNETIC CIRCUIT ELEMENT

William H. Middendorf, Fort Mitchell, Ky., assignor to Wadsworth Electric Manufacturing Company, Inc., Covington, Ky., a corporation of Kentucky Filed Oct. 17, 1968, Ser. No. 768,348
Int. Cl. H01h *37/58*
U.S. Cl. 335—146 22 Claims

ABSTRACT OF THE DISCLOSURE

A thermomagnetic device having a magnetic circuit including structure defining a high permeability magnetic path, a gap, a member movable in the gap in response to variations in the magnetic flux in the gap, a thermomagnetic element in the magnetic circuit having a permeability characterized by a sharp transition within a narrow temperature range, and a winding flux-linked to the magnetic circuit for producing a flux in the gap which changes substantially, to thereby shift the movable member, in response to changes in temperature of the element through the transition range.

This invention is directed to magnetic circuit devices using thermomagnetic circuit elements for the purpose of inducing, in response to changes in temperature of the thermomagnetic element, movement of a portion of the device thereby rendering the device temperature-sensitive.

Thermomagnetic materials are well-known and are characterized by having a magnetic permeability which changes sharply in magnitude when the temperature of the material passes through a narrow temperature range. Depending on the particular material, the magnetic permeability may sharply increase as the temperature of the material increases through the transition temperature, or alternatively, the permeability may sharply decrease as transition temperature is exceeded. Illustrative of themomagnetic materials of the former type are iron-rhodium alloys. Illustrative of materials of the latter type are iron-nickel or iron-manganese alloys.

Magnetic circuits utilizing thermomagnetic elements are also well-known and exist in many forms. Typically, such devices include a magnetic circuit having structure defining a high permeability magnetic path, a gap, a winding flux-linked to the circuit for establishing a flux therethrough, a thermomagnetic element in the circuit for inducing changes in the flux in the circuit in response to temperature variations of the element, and a member located in the gap movable in response to the variations in flux caused by temperature-induced permeability changes of the thermomagnetic element.

In one form of the foregoing device, herein termed the "movable armature" type, the movable member is a hinged, high permeability armature pivotal to alter a gap defined by the movable armature and a stationary core. When the temperature of the thermomagnetic element, which constitutes one leg of the magnetic circuit, changes, the flux in the circuit and hence in the gap changes, causing the hinged armature to move. The direction of armature movement, that is toward or away from the stationary core, depends upon the nature of the thermomagnetic material and the direction of the temperature change. For example, if the thermomagnetic material is of the type whose permeability sharply increases when its temperature passes above a specified transition range and if the armature is normally biased to an open-gap position, when the temperature of the thermomagnetic element reaches the transition temperature, the flux in the magnetic circuit rapidly increases, producing an attractive force on the armature which overcomes the armature bias and moves the armature in a direction to decrease the gap.

In another form of magnetic circuit in which thermomagnetic elements are employed, herein termed the "movable core" type, the thermomagnetic material is located in a biased core movable in a gap formed in an otherwise high permeability magnetic circuit path. With devices of this type, when the thermomagnetic core is in its low permeability condition, the magnetic flux in the circuit is insufficient to overcome the core bias and the core is positioned such as to create a substantial gap between it and one of the poles defining the gap. When the temperature of the thermomagnetic core changes, the flux in the magnetic circuit suddenly increases, overcoming the bias force and shifting the core to a position which closes, or at least reduces, the gap.

One of the problems with the prior art magnetic devices employing thermomagnetic elements is that their designs have not been such as to permit the amount of thermomagnetic material, which typically is significantly more costly than the other materials used in the devices, to be reduced to a minimum. Consequently, the cost of materials of such prior art devices has been undesirably high. Stated differently, the problem with prior art magnetic devices utilizing thermomagnetic elements is that for a given volume of thermomagnetic material the devices have not provided sufficiently large changes in force on the movable member for a change in temperature of the thermomagnetic element through the transition range, and hence the devices have lacked a high level of discrimination in responding to temperature changes.

Accordingly, it has been an objective of this invention to provide a magnetic device of the type employing a thermomagnetic element to render it temperature-sensitive which is designed such as to require a minimum amount of the relatively more costly thermomagnetic material or, stated differently, which is designed to provide a maximum force change for a temperature change through the transition range. This objective has been accomplished in accordance with certain of the principles of this invention by unique placement of the thermomagnetic material relative to the gap of a magnetic circuit in which the thermomagnetic element is utilized. In magnetic devices of the movable armature type, the circuit design of this invention contemplates placement of the thermomagnetic material adjacent the gap adapted to be closed by the movable armature; while in the movable core type device placement of the thermomagnetic element is remote from the gap. In the movable armature type device, placement of the thermomagnetic element adjacent the gap permits less flux to flow in paths which are auxiliary to the main flux path when the thermomagnetic element is in its low permeability condition, thereby affording a greater change in the force on the armature when the condition of the thermomagnetic element changes to its high permeability state. Placement of the thermomagnetic element remote from the gap in the movable core type device produces, for a given volume of thermomagnetic material, less fringing in the magnetic circuit, thereby affording in the case of a device of this type a greater change in reluctance, and hence a greater change in force on the movable core, as the thermomagnetic material changes from its low permeability state to its high permeability state. This change in force is enhanced by the existence of flux shunting the thermomagnetic element when below its critical temperature which exerts a force on the core in a direction opposite to that which exists when the thermomagnetic element is above its critical temperature.

An advantage of the magnetic devices constructed in accordance with the foregoing principles of this invention is that when utilized in a circuit breaker with the movable member normally biased to an open-gap position, the device can be made responsive to both instantaneous overcurrents of large magnitude as well as prolonged overcurrents of lesser magnitude. In the former case, the flux in the magnetic circuit generated by the large instantaneous overcurrent is sufficient to overcome the bias force on the movable member closing the gap and actuating the circuit breaker. In the latter case, that is the case of prolonged overcurrents of lesser magnitude, the overcurrent, while not sufficient to instantaneously shift the movable member and close the gap and actuate the circuit breaker, is sufficient when present for an extended period to heat the thermomagnetic element and thereby increase the flux in the magnetic circuit. The increased flux in turn shifts the movable member to close the gap and actuate the circuit breaker.

It has been a further objective of this invention to provide a magnetic device incorporating a thermomagnetic element of either the movable armature type or movable core type, which is substantially insensitive to variations in fit of the components comprising the device, thereby increasing the permissible dimensional tolerance level of the components and hence lowering the device cost. This objective has been accomplished in accordance with certain additional principles of this invention by placing the thermomagnetic element in series circuit arrangement with the high magnetic permeability portions of the magnetic device. A device, when constructed in this manner, is free of structure defining low reluctance paths shunting the thermomagnetic element which, if not closely controlled in dimension and fit, can significantly alter the effect of the thermomagnetic element in the magnetic device.

It has been a further objective of this invention to provide a magnetic device incorporating a thermomagnetic element which is suitable for use in a circuit breaker and which, when so used, enables a movable member to move to one of two positions in response to instantaneous large magnitude overcurrents which do not significantly change the temperture of the thermomagnetic element as well as in response to prolonged overcurrents of lesser value which do raise the temperature of the thermomagnetic element through the transition range. This objective has been accomplished in accordance with certain further principles of this invention by providing, in a magnetic device having structure defining a high permeability magnetic path and a gap defined by two poles, the combination of (a) a composite movable core having first and second series connected sections located adjacent different ones of said poles and which are saturable and unsaturable, respectively, above a predetermined flux level, and (b) a thermomagnetic element disposed in parallel with the saturable core section. At low temperatures and low current levels, the saturable core section is unsaturated and the movable core is positioned with the unsaturated core section in contact with its adjacent pole. At low temperatures and high current levels the saturable core section is saturated, causing the device to move the core to a position wherein the unsaturated core section is in contact with its adjacent pole. At high temperatures the thermomagnetic element shunts the saturable, but unsaturated, core section causing the core to move to a position wherein its unsaturable section is in contact with its adjacent pole.

It has been another objective of this invention to provide a magnetic device incorporating a thermomagnetic element which operates as a bi-directional latch or amplifier. This objective has been accomplished by securing at each end of a central core section movable between poles defining a gap in an otherwise high permeability magnetic circuit path flux-linked to a winding, two end core sections which are each shunted by stationary thermomagnetic elements which are simultaneously in opposite ones of their high permeability and low permeability conditions. In a preferred form of the bi-directional amplifier, two thermoelectric heat pumps are employed each in heat transfer relationship with different ones of the thermomagnetic elements. The heat pumps are supplied with oppositely directed currents to cause one of the pumps to absorb heat and thereby lower the temperature of its associated thermomagnetic element below the transition temperature, and cause the other of the pumps to generate heat to raise the temperature of its associated thermomagnetic element above the transition temperature.

In accordance with an arrangement of the foregoing type, by reversing the direction of the current flow, the temperature and hence the permeability of the thermomagnetic elements switch, causing a different one of the two end core sections to be shunted, thereby shifting the movable core from a latched position in contact with one pole to a latched position in contact with the other pole. Since the latching force is dependent upon the steady state flux in the magnetic circuit, which steady state flux can be made very large by utilization of a large ampere-turns product in the winding which flux-links the circuit, large forces can be controlled by a very small control current, namely, the control current flowing through the thermoelectric heat pumps.

Other objectives and advantages of this invention will be more readily apparent from a detailed description of the invention taken in conjunction with the accompanying drawings in which.

Figures 1, 2, 3, 4, 5, 6:
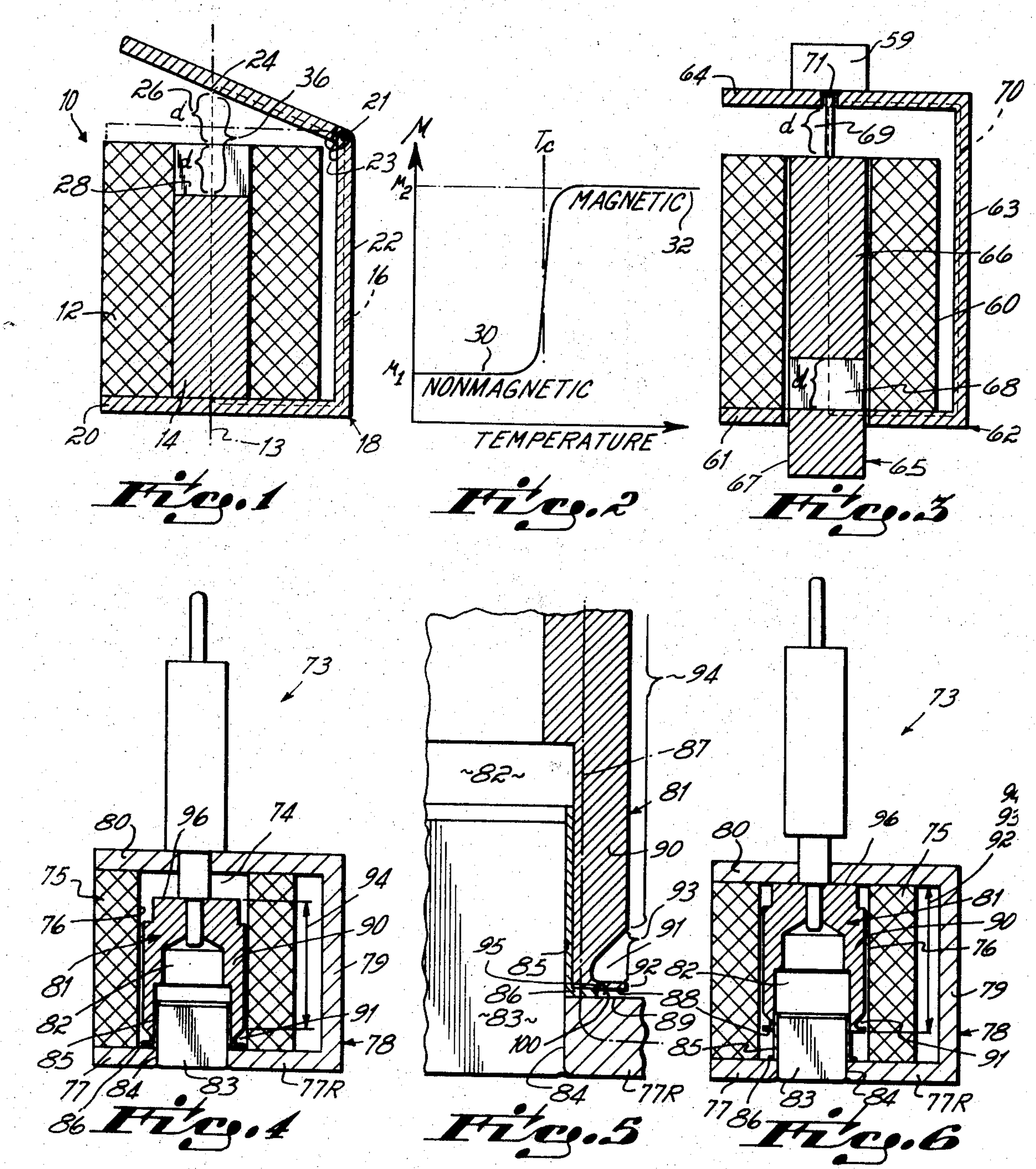
FIG. 1 is a cross section of a movable armature type device constructed in accordance with the principles of this invention.
FIG. 2 is a plot of permeability vs. temperature of a preferred type thermomagnetic material.
FIG. 3 is a cross section of a movable core type device constructed in accordance with the principles of this invention.
FIG. 4 is a cross section partially in elevation of a latchable magnetic device incorporating a thermomagnetic element showing the device in one of its two positions.
FIG. 5 is an enlarged view of a portion of the structure of FIG. 4.
FIG. 6 is a view similar to that of FIG. 4 showing the device in the other of its two positions.
Figure 12A:
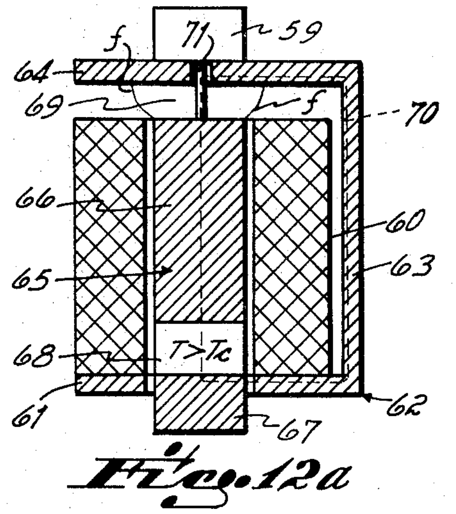
Figure 12B:
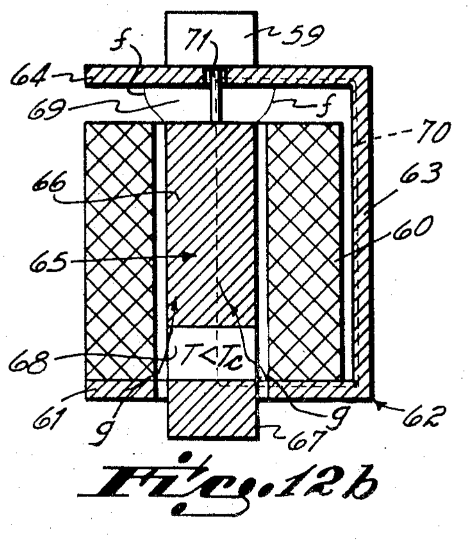

FIGS. 12*a* and 12*b* are cross section views of magnetic devices of the type shown in FIG. 3 showing the flux paths existing when the thermomagnetic element is in its high permeability and low permeability states, respectively.

Figure 13A:
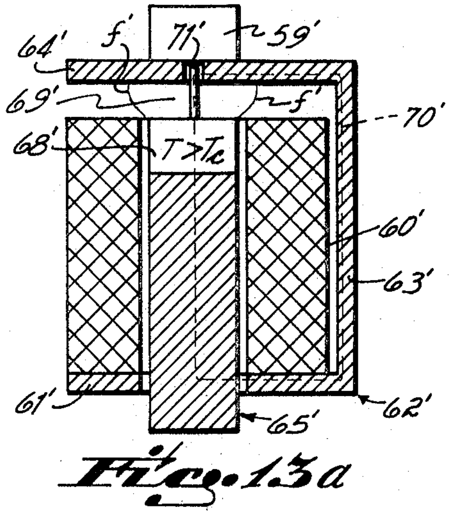
Figure 13B:
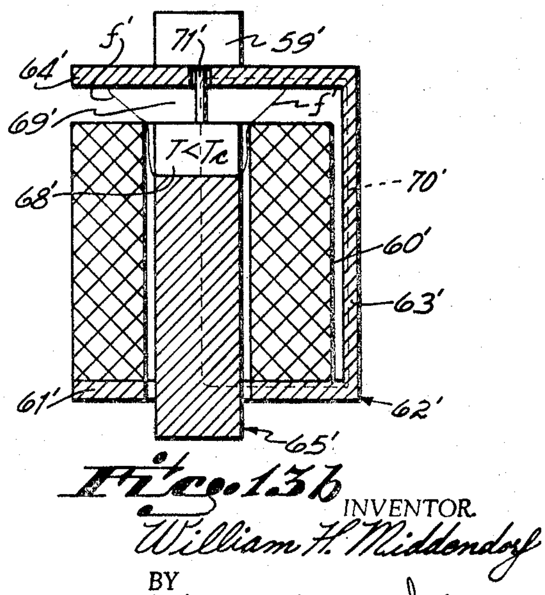

FIGS. 13*a* and 13*b* are cross section views of magnetic devices similar to that of FIGS. 12*a* and 12*b* and FIG. 3, except that the thermomagnetic element is located adjacent the gap, showing the flux paths when the thermomagnetic element is in its high permeability and low permeability conditions, respectively.

FIG. 1 depicts one embodiment of a magnetic device 10 incorporating certain of the principles of this invention. With reference to FIG. 1, the magnetic device 10 is seen to include an electrical winding or coil 12. The winding or coil 12 includes one or more individual turns symmetrically wound about a vertical axis defined by the imaginary line 13 passing through the center of the winding. The winding 12 is provided with suitable electrical terminals (not shown) which are connectable to a source of current (not shown) for establishing a major magnetic flux path 16 to be described. Disposed within the hollow central portion of the winding 12 is a core 14 fabricated of material having a high magnetic permeability, such as soft iron, and constituting one leg of the magnetic path 16. The high permeability core 14 has a length less than that of the hollow central portion of the winding 12 and is located in the lower portion thereof for reasons to become evident hereafter.

The magnetic device 10 further includes a stationary L-shaped structure 18 having a horizontal arm 20 to which the bottom of the winding 12 and core 14 are secured and a vertical arm 22. The L-shaped structure 18, like the core 14, is fabricated of material having a high magnetic permeability. The vertical arm 22, as well as the section of the horizontal arm 20 lying between the bottom end of the core 14 and the vertical arm 22, constitute portions of the magnetic circuit path 16. A movable member or armature 24 of high magnetic permeabiilty material, such as soft iron, is hinged by a pin 21 to the upper end of the vertical arm 22 for pivotal movement between an upper position shown in solid lines in FIG. 1 to which it is biased by a spring 23 and a lower position shown in dot-dash lines. The section of the movable member 24 adjacent the hinged end thereof forms a portion of the magnetic circuit path 16. An air gap 26, the length *d* of which varies with the angular position of the pivotal armature 24, is located between the movable member 24 and a thermomagnetic element 28 to be described.

The thermomagnetic element 28 is located in the upper portion of the central cavity defined by the winding 12 between the upper end of the high permeability core 14 and the air gap 26. The thermomagnetic element 28 is fabricated of material having a temperature-dependent permeability characterized by a sharp transition within a narrow temperature range. The material from which the element 28 is fabricated preferably has a permeability which is dependent on temperature in the manner illustrated by the plot of permeability vs. temperature depicted in FIG. 2. Referring to FIG. 2, it is noted that the permeability of the material from which element 28 is fabricated has a substantially uniform permeability of low value $\mu_1$ over a first temperature range 30 and a uniform permeability of higher value $\mu_2$ over a second temperature range 32. The change in permeability from the value $\mu_1$ to the value $\mu_2$ occurs over a very narrow temperature range which may be as low as a fraction of a degree. By proper compounding of the material from which the element 28 is fabricated, the temperature or range of temperatures over which the permeability changes from a low value $\mu_1$ to a high value $\mu_2$ may be varied. Materials exhibiting a temperature-dependent permeability of the type depicted in FIG. 2 are known in the art and accordingly are not described in detail herein. Such materials are described in the technical literature, for example, Product Engineering, "Developments to Watch," Jan. 29, 1968, at pages 75 and 76; and in Platinum Metals Review, vol. 7, No. 1, January 1963, "Magnetic Transformations in Iron-Rhodium Alloys." As disclosed by these references, iron-rhodium alloys, chromium-manganese antimonide compounds, and iron-manganese arsenide compounds exhibit permeabilities which are characterized by sharp transitions within a narrow temperature range.

In operation, when the temperature of the element 28 is below the critical or transition temperature T*c* characteristic of the material, the permeability of the element 28 is at a low value $\mu_1$, approximating the permeability of air. Consequently, when the temperature of the element 28 is below the transition temperature T*c*, the section 36 of the magnetic path 16 which includes the air gap 26 and the thermomagnetic element 28 has throughout its entire length a low permeability $\mu_1$ and a correspondingly high reluctance.

For a given ampere-turns of the winding 12 a given attractive force between the movable member 24 and the upper end of the core 14 is provided which in practice is insufficient to overcome the force provided by the bias spring 23. Consequently, the movable member 24 remains in the open position shown in solid lines in FIG. 1. When the temperature of the element 28 increases from a value below the transition temperature T*c* to a value above the transition temperature T*c*, the permeability of the element 28 abruptly changes from a permeability $\mu_1$ approximating that of air to a permeability $\mu_2$ approximating that of the core 14. The element 28 and the spring 23 are preferably constructed such that the change in permeability of the element 28 as its temperature rises from a value below the transition temperature T*c* to a value above the transition temperature T*c* causes the attractive force between the movable member 24 and the element 28 to overcome the bias supplied by the spring enabling the armature 24 to pivot counterclockwise about the pin 21 and thereby reduce the gap 26 to zero.

The movement of the armature 24 in response to a change in the temperature of the element 28 may be used to actuate a variety of devices, for example, a circuit breaker. In a circuit breaker application wherein the current through the protected equipment also passes through winding 12, the number of turns of the winding 12, the bias force provided by the spring 23, and the relative dimensions of the element 28 and the movable member 24 are selected such that the movable member 24 will be moved from the solid line position shown in FIG. 1 to the dot-dash line position in response to temperature changes of the thermomagnetic element 28 induced by undesirably prolonged overcurrents in the protected equipment. In circuit breaker applications, the foregoing parameters may also be, and preferably are, selected such that the movable member 24 may be changed from the solid line position depicted in FIG. 1 to the dot-dash line position in response to instantaneous currents in the winding having a magnitude substantially in excess of the magnitude of overcurrent which, when present for a prolonged period, will move the member 24. With such a design, a circuit breaker incorporating the device 10 will trip by reason of movement of the armature 24 to the dot-dash line position of FIG. 1 in response to instantaneous overcurrents of a specified magnitude and prolonged overcurrents of value less than said specified magnitude. In the case of instantaneous overcurrents a level of flux in the path 16 sufficient to overcome spring 23 and move armature 24 is produced by the large overcurrent in winding 12 notwithstanding that the temperature of element 28 is below T*c* and its reluctance, therefore, high in value. In the case of prolonged overcurrents of lesser value, the level of flux in the path 16 sufficient to move armature 24 is produced by reason of the change in reluctance of element 28 which occurs when its temperature is elevated above the transition temperature T*c* by prolonged heating of the element 28 by the coil 12 through which the overcurrent flows for an extended period.

Preferably the dimension *d* of the element 28 in the direction of the imaginary line 13 is chosen to be approximately equal to the average distance *d* between the upper surface of the element 28 and the movable member 24. With the dimension of the element 28 so chosen, the reluctance of the path 16 decreases as the temperature of the element 28 goes from a temperature below the transition temperature T*c* to a temperature above the transition temperature T*c*, providing a change of approximately 100% in the attractive forces between the movable member 24 and the core 14 as the temperature of the element 28 increases from a point below the transition temperature T*c* to a point above the transition temperature T*c*.

Figure 10:
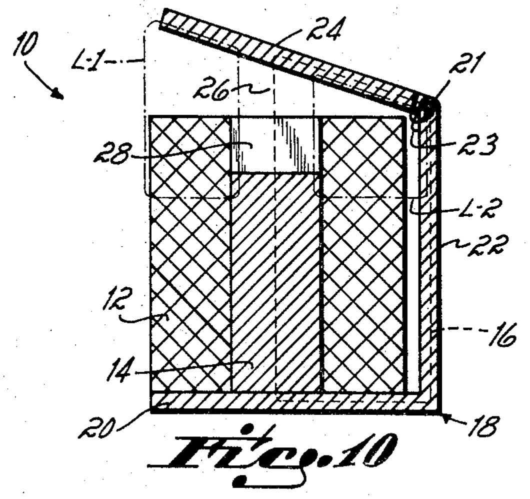
FIG. 10 is a cross section of the magnetic device of FIG. 1 showing the main and auxiliary flux paths.
Figure 11:
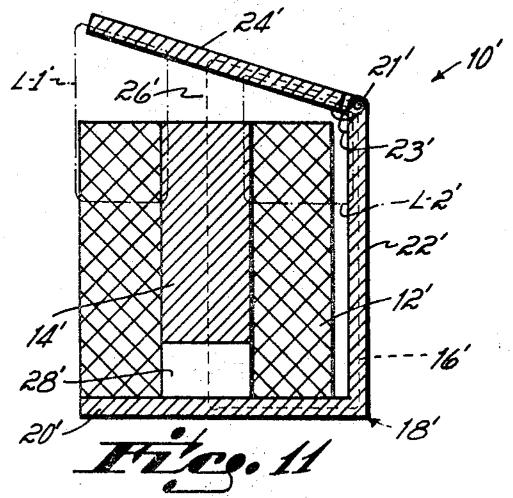
FIG. 11 is a cross section of a magnetic device similar to that of FIG. 1, but with the thermomagnetic element remote from the gap, showing the main and auxiliary flux paths.

Placement of the thermomagnetic element 28 adjacent the air gap 26, in contrast to placement remote from the air gap such as adjacent the element 20, in accordance with the principles of this invention provides a very unique and unobvious result, namely, a greater change in the attractive forces on the armature 24 as the temperature of the element 28 passes from a point below the transition temperature Tc to a point above the transition temperature. Referring to FIGS. 10 and 11, two embodiments of a movable armature-type electromagnetic device incorporating a thermomagnetic element in the core are depicted. The devices of FIGS. 10 and 11 are identical except that in the device of FIG. 10 which is constructed in accordance with the principles of this invention, the thermomagnetic element 28 is adjacent the air gap 26, whereas in the device of FIG. 11 the thermomagnetic element is remote from the air gap and adjacent the member 20'.

With both the device of FIG. 10 and the device of FIG. 11, when the temperature of the thermomagnetic elements 28 and 28' is above the critical temperature Tc, the entire core disposed within the central portion of the windings 12 and 12', including the thermomagnetic elements 28 and 28' and the high permeability core portions 14 and 14', is characterized by having a high magnetic permeability. Accordingly, for a given ampere-turns for the devices of both FIGS. 10 and 11, the flux characteristics in the gaps 26 and 26' are the same, providing substantially equal magnetic attractive forces on the armatures 24 and 24'.

However, for reasons to be described presently, when the temperature of thermomagnetic elements 28 and 28' of each of the devices of FIGS. 10 and 11 is below the transition temperature Tc, the characteristics of the flux in the gaps 26 and 26' are different, providing different magnitude attractive forces on the armatures 24 and 24', the force on the armature 24 of FIG. 10 being less than the force on the armature 24' of FIG. 11. With equal forces on the armatures 24 and 24' of the devices of FIGS. 10 and 11 at temperatures above the transition temperature Tc, and different forces on the armatures below the transition temperature, the force on armature 24 being less than the force on armature 24', the change in attractive force on the armature 24 as the thermomagnetic element 28 passes through the transition temperature is greater for the device of FIG. 10 than for the device of FIG. 11, enabling the device of FIG. 10 to have greater discrimination in operation.

At temperatures below the transition temperature Tc when the thermomagnetic elements 28 and 28' have permeabilities approximating that of air, in both the device of FIG. 10 and FIG. 11, in addition to the main flux path 16 and 16', two auxiliary flux paths exist in each device, namely, auxiliary flux paths L–1 and L–2 in the device of FIG. 10 and auxiliary flux paths L–1' and L–2' in the device of FIG. 11. The reluctance of auxiliary paths L–1 and L–2 of the device of FIG. 10 is greater than the reluctance of paths L–1' and L–2' of the device of FIG. 11 since paths L–1 and L–2 have the low permeability element 28 therein which is not in path L–1' and L–2'. With the reluctance of auxiliary paths L–1 and L–2 greater than that of the paths L–1' and L–2', less flux exists in auxiliary paths L–1 and L–2 than in auxiliary paths L–1' and L2'. With less flux in the device of FIG. 10 than in the device of FIG. 11, the attractive force on the armature 24 of the device of FIG. 10 is less than the attractive force on the armature 24' of the device of FIG. 11 at temperatures below the transition temperature. Since the attractive force on the armatures 24 and 24' are the same at temperatures above the transition temperature, the entire core of both devices being highly permeable, and since the attractive forces on the armature 24 are less than the attractive forces on the armature 24' at temperatures below the transition temperature, the change in attractive force on the armature 24 is greater as the transition temperature is surpassed for the device of FIG. 10 than for the device of FIG. 11. Thus, there is more discrimination with the device of FIG. 10 than with the device of FIG. 11.

FIG. 3 depicts a second embodiment of the invention which is of the movable core type configuration in contradistinction to the movable armature construction characterized in the embodiment of FIG. 1. Referring to FIG. 3, the second embodiment is seen to include a winding 60 which may be of the same general construction as the winding 12 of FIG. 1. The winding 60 is secured at its lower end to a lower horizontal arm or pole-defining member 61 of a generally C-shaped structure 62, also including a vertical arm 63 and an upper horizontal arm or pole-defining member 64. Slidable within the central cavity defined by the winding 60 is a movable member generally indicated by the reference numeral 65. The member 65 includes upper and lower core sections 66 and 67, respectively, between which is positioned an element 68. The upper and lower core sections 66 and 67 are fabricated of a material having a high degree of magnetic permeability as is the C-shaped member 62. By virtue of the high permeability material of C-shaped member 62, a first flux path segment of high permeability is established therethrough. Between pole-defining arm members 61 and 64 is, exclusive of the effects of the movable member 65, a low permeability flux path segment. The element 68, like the element 28 depicted in FIG. 1, is fabricated of material having a permeability which is temperature sensitive and which exhibits a sharp transition in permeability over a narrow temperature range such as shown in the plot of FIG. 2.

The movable member 65 is adapted to shift vertically between a lower position depicted in FIG. 3 in which an air gap 69 exists having a length *d* between the upper end of the core section 66 and the upper horizontal arm 64, and an upper position in which the upper end of the core section 66 and the horizontal arm 64 abut to eliminate the air gap 69. Downward travel of the movable member 65 in the central cavity of the winding 60 is limited by abutment of a non-magnetic stop 59 with the upper surface of the horizontal arm 64, the stop 59 being rigidly secured to the upper end of the core section 66 by a non-magnetic rod 71 fastened to both the stop and the core section. The vertical dimension of the lower core section 67 is preferably selected to be slightly longer than the maximum air gap 69. With the vertical dimension of the lower core section 67 so selected, when the movable member 65 is in its upper-most position there is no substantial air gap between the lower core section 67 and the inner section of the lower horizontal arm 61.

In operation, the movable member 65 remains in its lower position depicted in FIG. 3 so long as the attractive forces between the horizontal arm 64 and the upper core section 66 are below the value necessary to lift the movable member upwardly, the value necessary for upward movement being dependent upon the bias force afforded by the weight of the movable member 65. By proper design of the movable member 65, and C-shaped structure 62, the movable member 65 can, for a first specified ampere-turns in the winding 60, be made to move upwardly to abut the horizontal arm 64 in response to a change in temperature of the element 68 from below the transition temperature Tc to above the transition temperature induced by heating thereof by the winding 60. It will be understood that for a given design of the movable member 65 and C-shaped structure 62, there will be for the winding 60 a second specified ampere-turns, which exceeds in value said first specified ampere-turns, which will be sufficient to move the member 65 against the arm 64 and thereby eliminate the gap when the temperature of the element 68 is below the transistion temperature T. When the device of FIG. 3 is used in a circuit breaker, the first specified ampere-turns value is selected to produce tripping in response to prolonged overcurrents, while the second specified ampere-turns value is selected to effect tripping in response to instantaneous overcurrents exceeding in value the overcurrent value which, only if prolonged, will cause tripping.

The verticle dimensions of the element 68, like the vertical dimensions of the element 28 of FIG. 1, is designed to be substantially equal in length *d* to the maximum air gap 69. This affords a change in reluctance sufficient to double the attractive force between the upper core section 66 and the horizontal arm 64 in response to a change in temperature in the element 68 from a point below the transition temperature T*c* to a point above the transition temperature T*c*.

The device of FIG. 3 wherein the thermomagnetic element 68 is remote from the air gap 69, when compared to a similar device wherein the thermomagnetic element 68 is located adjacent the gap 69, provides a very unobvious advantage, namely, a greater force change on the moving core 65 as the critical temperature T*c* of the thermomagnetic element is surpassed. To illustrate the nature of this advantage, reference is made to FIGS. 12*a* and 12*b*, which illustrate a device in accordance with FIG. 3 wherein the thermomagnetic element 68 is located remote from the air gap 69, and FIGS. 13*a* and 13*b*, which illustrate a device wherein the thermomagnetic element 68' is located adjacent the air gap 69'.

FIGS. 12*a* and 13*a* illustrate the devices with their respective thermomagnetic elements 68 and 68' above the transition temperature T*c*. With the thermomagnetic element 68' of the device of FIG. 13*a* above the transition temperature T*c*, the upper end of the moving member 65' is highly permeable as is the upper end of the movable member 65 of FIG. 12*a*. Accordingly, the flux in gaps 69 and 69' exhibit the same flux pattern, including the same extent of fringing. Accordingly, when the temperature of thermomagnetic elements 68 and 68' is above the transition temperature T*c*, the forces on movable members 65 and 65' are substantially identical.

In contrast to the above situation, wherein the forces on the movable members 65 and 65' of the devices of FIGS. 12*a* and 13*a* are substantially identical when the temperatures of their thermomagnetic elements 68 and 68' are above the critical temperature, reference is made to FIGS. 12*b* and 13*b* which depict the flux conditions existing in the respective devices when their thermomagnetic elements are below critical temperature. With the temperature of thermomagnetic elements 68 and 68' of the devices of FIGS. 12*b* and 13*b* below the critical temperature, the force on the movable core 65 of the device of FIG. 12*b* is substantially less than the force on the movable core of the device of FIG. 13*b*. This force differential is attributable to the marked difference in reluctance of the main flux paths 70 and 70' of the respective devices.

In comparing the reluctance of the main flux paths 70 and 70' of the respective devices of FIGS. 12*b* and 13*b*, the contribution to path reluctance of the cold thermomagnetic elements 68 and 68' in each device may be considered substantially equal. The principal contribution to the difference in reluctance of the main flux paths 70 and 70' of the devices of FIGS. 12*b* and 13*b* is provided by the difference in reluctance of the working gaps 69 and 69'. Due to the substantially greater degree of flux fringing *f'* in the working gap 69' of the device of FIG. 13*b* as compared to the flux fringing *f* in the working gap 69 of the device of FIG. 12*b*, the reluctance of the working gap 69' is considerably less than the reluctance of the working gap 69. With the reluctance of the working gap 69' less than the reluctance of the working gap 69, the force on the movable core 65' of the device of FIG. 13*b* is greater than the force on the movable core 65 of the device of FIG. 12*b*. With the force on the movable core 65' of the device of FIG. 13*b*, when its thermomagnetic element 68' is in its cold state, considerably greater than the force on the movable core 65 of the device of FIG. 12*b* when its thermomagnetic element 68 is in its cold state, the percentage change in force occasioned by the temperature of the thermomagnetic elements 68 and 68' passing through the transition temperature T*c* is much less for the device of FIG. 13*b* than for the device of FIG. 12*b*. Thus, the device of FIGS. 12*a* and 12*b* has a greater discrimination in operation insofar as responding to temperature changes through the transition temperature T*c* are concerned than does the device of FIGS. 13*a* and 13*b*.

A further factor enhancing the discriminatory characteristics of the device of FIGS. 12*a* and 12*b* is the existence of flux *g* (FIG. 12*b*) flowing between stationary member 61 and the lower extremity of core portion 66, which exists when the thermomagnetic element 68 is in its cold state. The flux *g* exerts a force on the core 65 in a downward direction which opposes the upward force exerted on the core by the flux in the working gap. Thus, the existence of flux *g* in the device of FIG. 12*b* when the temperature of thermomagnetic element 68 is below the critical temperature T*c* accentuates the change in force on core 65 which occurs when the temperature of the thermomagnetic element passes through the transition temperature T*c*.

An advantage of the devices of FIGS. 1 and 3 is that their operational characteristics are relatively insensitive to dimensional variations of the components. This insensitivity to variations in dimensions of the components is attributable to the placement of the thermomagnetic elements 28 and 68 of the devices of FIGS. 1 and 3 in series magnetic circuit arrangement in the principal magnetic flux paths 16 and 70. Other devices employing thermomagnetic elements which are capable of being actuated in response to instantaneous overcurrents of a value substantially in excess of the value of overcurrent which, when sustained over an extended period, is sufficient to heat the thermomagnetic element and actuate the device, provide parallel magnetic return paths, one of which contains a thermomagnetic element and the other of which contains a conventional high permeability element. If an instantaneous flux of very high value occurs, the flux in the return path containing the high permeability material actuates the device. If an overcurrent of lesser value, but of extended duration, occurs, the thermomagnetic element in the other parallel return path becomes highly permeable, actuating the device. In devices such as this, the parallel return path containing the high permeability element is necessarily of low reluctance and as a consequence very slight dimensional variations in the parts cause major changes in calibration from device to device. In accordance with the principles of this invention wherein the thermomagnetic device, is in series circuit arrangement in the major magnetic path, the device is relatively insensitive to minor changes in the dimensions and hence fit of the components comprising the device.

A further embodiment of a movable core type of this invention is depicted in FIG. 4. Referring to FIG. 4, this embodiment is seen to include a winding 75 which may be of the same general construction as that depicted in FIGS. 1–3. The winding 75 has a central cavity 76 and is mounted on a lower horizontal arm or pole-defining member 77 of a generally C-shaped structure 78 having a vertical arm 79 and an upper horizontal arm or pole-defining member 80. The C-shaped structure 78 is fabricated of high magnetic permeability material, establishing therethrough a high permeability flux path segment and establishing between pole-defining arm members 77 and 80 a low permeability flux path segment. Positioned within the central cavity 76 of the winding 75 is a movable core 81. The movable core 81 is fabricated of a material having a high magnetic permeability and is provided with a blind hole 82 the lower end of which opens downwardly.

Positioned within the blind hole 82 of the core 81 is a thermomagnetic element 83 having its lower portion rigidly secured in an aperture 84 formed in the lower horizontal arm 77 of the C-shaped structure 78. The periphery of the element 83 preferably conforms with the lower interior surface of the blind hole 82. The element 83 like the elements 28 and 68 of FIGS. 1 and 3 is fabricated of material having a permeability characterized by a sharp transition over a given narrow temperature range. A non-magnetic sleeve 85 fabricated of, for example, brass, circumscribes the upper portion of the element 83 and functions as a low friction bushing between the periphery of the element 83 projecting above the lower horizontal arm 77 and the cooperating lower internal surface of the blind hole 82. The sleeve 85 has a horizontally extending lip 86 which functions to space the lower-most surface 88 of the core 81 from the upper-most surface 89 of the horizontal arm 77, establishing a very small gap 100 between the surfaces 88 and 89.

The annular cross-section wide wall 90 of the core 81, which circumscribes the blind hole 82, is provided with a circular groove 91, preferably in the periphery of the wall 90, closely adjacent but spaced slightly from the lower-most surface 88 of the core. The groove 91 functions to divide the core 81 into three functionally different vertically stacked sections 92, 93 and 94 which form series connected components of a magnetic circuit path 87 which also includes the low permeability air gap 100 located between the lower surface 88 of the core 81 and the upper surface 89 of the horizontal arm 77 and which includes brass lip 86, as well as the right-hand portion 77R of the horizontal arm 77. Section 93 because of its smaller cross-sectional area along the magnetic path 87 is adapted to become magnetically saturated at a flux level for which sections 92 and 94 are magnetically unsaturated. The exact flux level at which the section 93 becomes saturated can be altered by altering the depth of the groove 91 which effectively alters the cross-section of the section 93 through which flux in the path 87 flow. Increasing the depth of groove 91 is effective to lower the flux level in the path 87 at which the section 93 becomes magnetically saturated. The vertical dimension of the element 83 and the vertical location of the groove 91 must be selected such that when the core 81 is in its upper position with the top 96 thereof abutting the lower surface of the arm 80, the element 83 is susceptive of providing a magnetic shunt between the wall structure defining section 94 and the horizontal arm 77 when the element 83 is placed in its high permeability condition.

In operation, when the temperature of the element 83 is below the transition temperature T*c* placing the element 83 in its low permeability state and the ampere-turns of the winding 75 is below the value necessary to magnetically saturate the wall structure defining section 93, the core 81 assumes the lower position depicted in FIG. 4. The flux generated by the winding 75 flows in the path including gap 74, upper horizontal arm 80, vertical arm 79, lower horizontal arm section 77R, low permeability path defined by lip 86 and gap 100, core wall structure sections 92, 93 and 94. No appreciable magnetic flux flows through the element 83 because in its low permeability condition it appears as air having a high reluctance. Since the gap 100 defined between foot 95 and upper surface 89 of lower horizontal leg 77 is substantially smaller than the gap 74 between the top 96 of the core 81 and horizontal arm 80, the attractive forces between the foot 95 and the lower horizontal arm 77 exceed the attractive forces between the top 96 of the core 81 and the upper horizontal arm 80. Accordingly, the core 81 is drawn to and remains in its lower position depicted in FIG. 4.

Assuming the temperature remains below the transition temperature, should the current in the winding 75 instantaneously exceed the value necessary to magnetically saturate the core wall structure defining the section 93, the core 81 is shifted from its lower position depicted in FIG. 4 to its upper position depicted in FIG. 6. When the wall structure defining section 93 magnetically saturates, the permeability thereof is substantially that of air. Under such conditions, the core 81 moves in the upward direction to decrease the gap 74. As those skilled in the art will appreciate, the core 81 moves in the direction which produces the greatest reduction in circuit reluctance. In this case, that is, with the element 83 in the low permeability condition and the wall structure defining section 93 magnetically saturated, core 81 moves upwardly reducing the gap 74 to approximately zero, assuming the position providing the greatest reduction in reluctance of the magnetic circuit. With the core 81 in the upper position and the core top 96 and horizontal arm 80 in contact, providing a gap 74 of approximately zero, the total reluctance of the magnetic circuit including core wall structure defining section 94, horizontal arm 80, vertical arm 79, horizontal arm section 77R, gap 100, saturated core wall section 93, and foot 95 is less than the total reluctance of the circuit when the core 81 is in its lower position which includes gap 74, arms 80, 79 and 77R, gap 100, unsaturated sections 92 and 94, and saturated section 93.

Assuming the ampere-turns of the winding 75 is such that the flux through the path 87 is insufficient to magnetically saturate the wall structure defining the section 93, should the temperature of the element 83 change from a value below the transition temperature wherein the element resides in its low permeability state to a temperature above the transition temperature wherein the element 83 is placed in its high permeability state, the core 81 moves from its lower position depicted in FIG. 4 to its upper position depicted in FIG. 6. When the temperature of the element 83 moves from a level below the transition temperature T*c* to a level above the transition temperature, changing the permeability of the element 83 from that approximating air to that approximating steel, magnetic flux flows through the element 83 effectively providing a magnetic shunt between the arm 77 and the core wall section 94. This magnetic shunt path magnetically short-circuits the gap 100. The core 81 therefore moves upwardly urging its top surface 96 into contact with the arm 80 because it is only by such movement that the total circuit path reluctance can be reduced to a minimum value. Thus, when the element 83 rises above the transition temperature magnetically shunting the gap 100, the gap 100 is effectively removed from the magnetic circuit leaving gap 74 as the only gap in the magnetic circuit. Accordingly, the only direction in which the core 81 can move to reduce the total reluctance of the magnetic circuit is in the upward direction to reduce the gap 74.

The foot 95 which defines the section 92 functions, when the wall structure defining the section 93 is magnetically unsaturated, to enhance the attractive force between the foot 95 and the arm 77 for a specified ampere-turns in the winding 75 thereby providing a greater flux in the path 87 at any given ampere-turns below the level necessary to saturate section 93. Thus, foot 95 by increasing the flux flow in the path 87 for a given ampere-turns level, increases the attractive force between the core 81 and the arm 77 increasing the holding force between the core 81 and the arm 77 when the core 81 is in its lower position. If desired, the foot 95 may be eliminated. If the foot 95 is eliminated, the embodiment of FIGS. 4–6 operates in the same general manner as described previously with the exception that the holding force between the core 81 and the arm 77 when the core is in its lower position is less.

The groove 91 may, if desired, be placed in the interior wall of the blind hole 82, or the external groove 91 may be supplemented by an additional groove placed in the interior surface of the blind hole 82. Respecting the groove 91, it is only essential that it produce a section 93 in series with the section 94 which saturates at a lower flux level therethrough than the section 94.

If desired, the element 83 may be designed such that it has an internal cavity dimensioned and configured to slideably receive the core 81. If the element 83 is designed to receive the core 81 in an internal cavity in the former, the core 81 need not be provided with the blind hole 82. With such an arrangement, it is only necessary that the core 81 be provided with the functional equivalent of the groove 91 which divides the core into two axial sections saturable at different flux levels. Additionally, with such an arrangement the element 83 must be adapted to magnetically shunt the core section saturable at the lower flux level when the element 83 is placed in its high permeability state.

In each of the three embodiments depicted in FIGS. 1, 3, and 4–6, a magnetic device has been described which is capable of shifting a movable member in the magnetic circuit path thereof in response to both a change in temperature of an element in a magnetic circuit path having a temperature-dependent permeability of a type depicted in FIG. 2, as well as in response to an increase in the ampere-turns in the winding in excess of a predetermined level notwithstanding the temperature of the element having a temperature-dependent permeability is below the transition temperature. This capability of the magnetic device of FIGS. 1, 3, and 4–6 to shift a movable member in response to both a temperature change and an ampere-turns change renders the device peculiarly adapted for use in circuit breakers.

Figure 7:
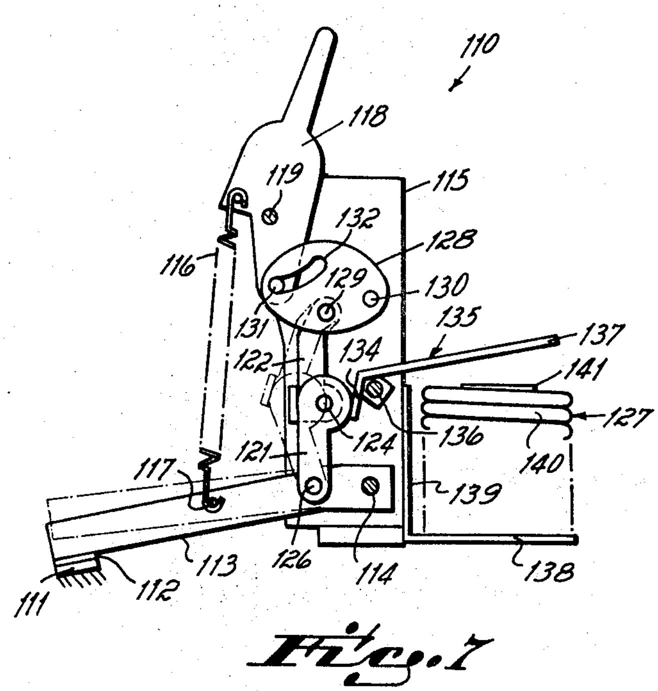
FIG. 7 is an elevational view of a circuit breaker incorporating the movable armature type device of this invention.

Referring to FIG. 7, a circuit breaker generally indicated by the reference number 110, is illustrated having a fixed contact 111 and a movable contact 112. The movable contact 112 is secured to the free end of an arm 113 pivotal about a pin 114 secured to the circuit breaker frame 115. The arm 113 is biased in the upward direction tending to pivot it clockwise about the pin 114 by a spring 116. Spring 116 is secured at its lower end to the intermediate portion of the arm 113 by a pin 114, and is secured at its upper end to a reset handle 118 mounted for pivotal movement about a pin 119 secured to the frame 115. The arm 113 is normally maintained in the solid line position shown in FIG. 7 electrically coupling the fixed and movable contacts 111 and 112 by a toggle mechanism including links 121 and 122 which at their inner ends are pivotally connected by a pin 124 and at their outer ends are respectively pinned to the arm 113 via a pin 126 and to a link 128 via a pin 129. The link 128 is pinned to the circuit breaker frame 115 by a pin 130. The resetting switch 118 is provided with a pin 131 which engages an arcuate slot 132 in the link 128.

The links 121 and 122 are movable between the solid line position depicted in FIG. 7 wherein the contacts 112 and 111 are connected and the dot-dash line position wherein the contacts 111 and 112 are electrically disconnected. Movement of the links 121 and 122 from the solid line position to the dot-dash line position is effected by a bellcrank mechanism, armature, or movable member 135 pivotal about a pin 136 secured to the frame 115. The bellcrank 135 has a first arm 134 and a second arm 137. Pivotal movement of the armature 135 about the pin 136 to move the toggle links 121 and 122 from the solid line position to the dot-dash line position to electrically disconnect the contacts 111 and 112 is produced by means of an actuator 127 comprising a winding 140 having a core 141 located centrally thereof. The winding 140 establishes a flux path through the core 141, the armature or movable member 135, pin 136, a vertical arm 139, and horizontal arm 138 mounting the winding 140 to the frame 115, and the frame structure lying between the pin 136 and the vertical arm 139. In practice, the actuator 127 may take the form of device 10, the winding 140 the form of the winding 12, the core 141 the form of core 14 and 28, the armature 135 the form of armature 24, the arm 138 the form of arm 20, the arm 139 the form of arm 22, and the pin 136 the form of pin 21 of the device as depicted in FIG. 1.

With the electromagnetic actuator 127 of FIG. 7 taking the form of the magnetic device 10 of FIG. 1, the winding of the device is connected in series with the electrical contacts 111 and 112. With the winding of the device so connected, if there is an instantaneous overload current of very high level the arm 137 of armature 135 is drawn toward the core 141 moving the pin 124 of FIG. 7 to the left effectively breaking the knee of the toggle links 121 and 122. This enables the spring 116 to pivot the arm 113 about the pin 114, electrically disconnecting the contacts 111 and 112 and thereby breaking the circuit in which the contacts 111 and 112 and the winding 140 of electromagnetic actuator 127 are connected.

Should the current in the winding 140 of the electromagnetic actuator 127 not rise to the level necessary to instantaneously move the armature 135 and trip the circuit breaker 110, the circuit breaker may also be tripped by another mechanism. Specifically, the circuit breaker may be tripped if the current through the winding 140, which corresponds to the current in the circuit to be protected, exceeds a predetermined level below that necessary to instantaneously trip the breaker for a period sufficient to heat the thermomagnetic portion (not shown) of the core 141 corresponding to element 28 of FIG. 1 to a temperature above the transition temperature. Should this occur, the armature 135 is drawn toward the core 141, tripping the circuit breaker in the manner indicated previously.

Resetting of the circuit breaker 110 is effected by first rotating the switch 118 counterclockwise about the pin 119. This is effective to move the pin 131 in the slot 132 from the position shown in FIG. 7 to the opposite end of the slot. Further movement of the switch arm 118 in the counterclockwise position is effective to pivot link 128 clockwise about the pin 130. Pivotal motion of the link 128 in this manner draws the pin 129 upwardly returning the toggle links 121 and 122 to their colinear, locked position. The switch arm 118 is now rotated clockwise about the pin 119 to the position shown in FIG. 7 wherein contacts 111 and 112 are electrically connected, and the pin 131 is positioned in the slot 132 in the position depicted in FIG. 7, conditioning the links so that the armature 135 may again break the knee of the toggle mechanism and trip the breaker.

Figure 8:
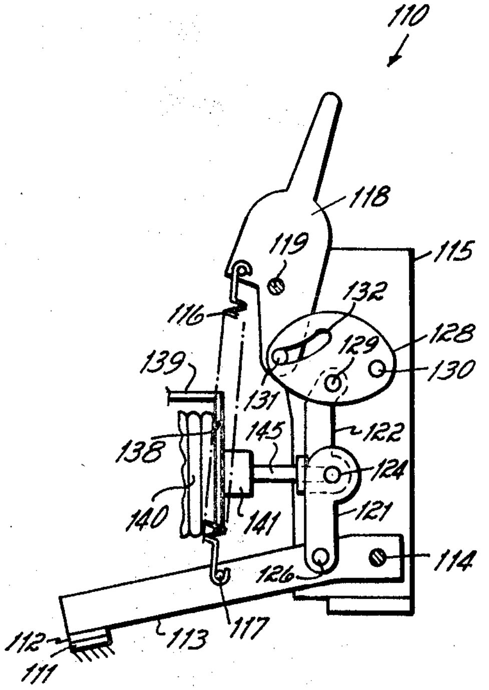
FIG. 8 is an elevational view of a circuit breaker incorporating the movable core type device of this invention.

In addition to using the magnetic device 10 of the movable armature type for actuating the circuit breaker 110, it is also possible to use magnetic devices of the movable core type depicted in FIGS. 3 and 4. Such an arrangement is shown in FIG. 8 wherein like reference numerals indicate like elements in the FIGS. 3–7. Referring to FIG. 8, when the temperature of the element having the temperature-dependent permeability is below the transition temperature, the circuit breaker can be tripped should the instantaneous current in the winding 140 exceed the value necessary to move a link 145 connected between the movable core 141 and the pin 124 interconnecting the toggle links 121 and 122.

The circuit breaker 110 can also be actuated by instantaneous currents above that which trip the circuit breaker when sustained for a predetermined time sufficient to heat the element having the temperature-dependent permeability to a temperature above the transition temperature. When this occurs, the core 141 moves the link 145 shifting the position of the pin 124 and breaking the knee of the toggle mechanism.

Figure 9:
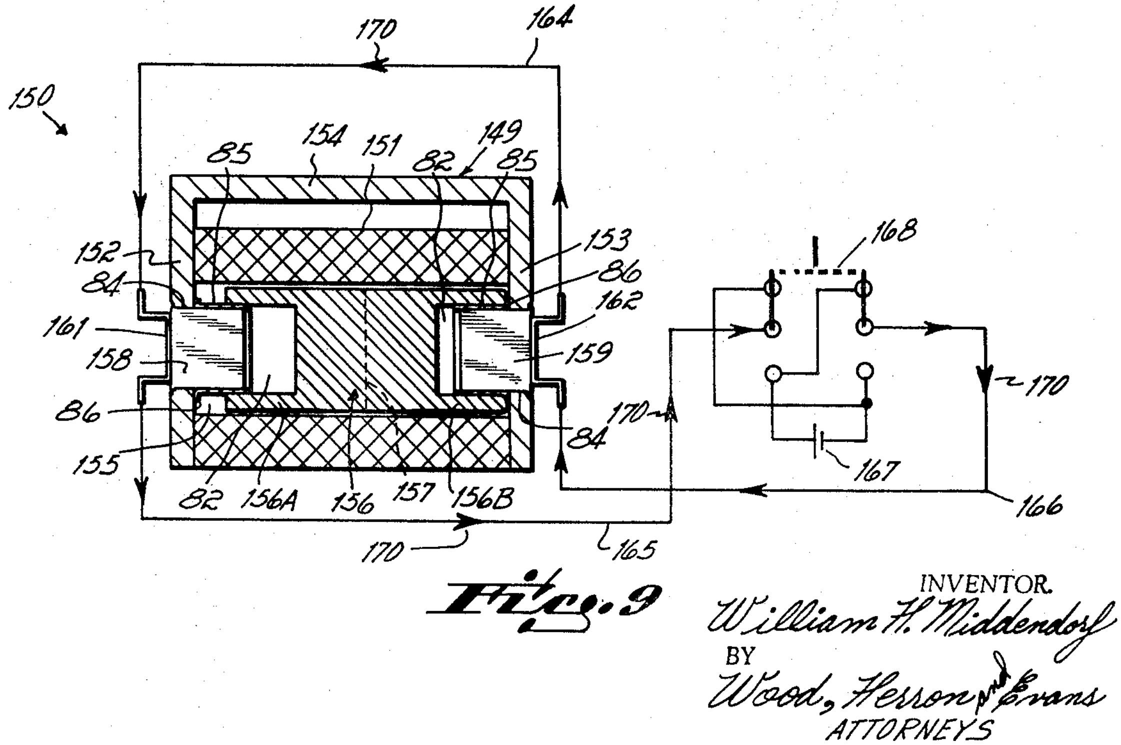
FIG. 9 is a cross section of bi-directional amplifier incorporating a device similar to the device of FIGS. 4–6.

A magnetic device similar to the magnetic device 73 depicted in FIGS. 4–6 may be utilized as a component of a very unique electromagnetic bi-stable latch 150 depicted in FIG. 9. Referring to FIG. 9, the bi-stable latch 150 is seen to include a winding 151 which may be constructed in a manner similar to windings 12, 60 and 75 of FIGS. 1, 3 and 4, respectively. The winding 151 is mounted between spaced vertical arms or pole-defining members 152 and 153 of a generally C-shaped bracket 149. The arms 152, 153 of bracket 149 are joined by a central horizontal arm 154. Arms 152–154 are fabricated of material having a high magnetic permeability, establishing therethrough a high permeability flux path segment and establishing between pole-defining arms 152 and 153 a low permeability flux path segment. Disposed within a central cavity 155 formed by the winding 151 is a core 156 which may be considered as composed of two identical sections 156A and 156B joined along an imaginary plane 157. Each of the core sections 156A and 156B of the core 156 may be constructed substantially identically to core 81 of the magnetic device 73 depicted in FIG. 4 except that the groove 91 of FIG. 4 may be eliminated if desired. Cooperating with each of the core sections 156A and 156B are elements 158 and 159 which have their outer ends positioned in apertures 84—84 formed in the vertical arms 152 and 153, respectively. The elements 158 and 159 are fabricated of the same material as the element 83 of FIG. 4 and cooperate with the core sections 156A and 156B in a manner similar to that which the element 83 cooperates with the core 81. In view of the similarity of elements 158 and 159 to element 83 and core sections 156A and 156B to core 81, like reference numerals are used to identify structural features in FIG. 9 having counterparts in FIG. 4.

Located in heat transfer relationship to the outer end surfaces of the elements 158 and 159 are thermoelectric heat pumps 161 and 162, respectively. The thermoelectric heat pumps 161 and 162 are well known in the art and accordingly are not described in detail herein. As those skilled in the art will appreciate, the thermoelectric heat pumps 161 and 162 are characterized by providing heat when current flows therethrough in a first direction and absorbing heat when current flows therethrough in the opposite direction. The thermoelectric heat pumps 161 and 162 are connected in series electrical circuit via lines 164, 165 and 166 with a source of direct current 167. A double-pole double-throw switch 168 interconnects the source 167 and the lines 165 and 166 such that the switch in one position passes current through the thermoelectric heat pumps 161 and 162 to cool and heat the heat pumps 161 and 162, respectively, and in the other position passes current through the heat pumps 161 and 162 to heat and cool the heat pumps 161 and 162, respectively.

In operation, when the switch is in the position shown, current flows through lines 164–166 in the direction of the arrows 170. With current flowing in the circuit in the direction of arrows 170, the thermoelectric heat pumps 162 and 161 cool and heat the elements 159 and 158, respectively. Heating of the element 158 causes its temperature to rise from a point below the transition temperature to a point above the transition temperature placing the element 158 in the high permeability state. Cooling of the element 159 causes the temperature of this element to assume some temperature below the transition temperature placing the element 159 in the low permeability state. With the elements 159 and 158 in the low and high permeability states, respectively, the core 156 moves from the position shown in FIG. 9 to its other position (not shown) and is latched in this position by the high attractive forces between the vertical arm 152 and the core section 156A. If the position of the switch 168 is reversed causing current to flow in a direction opposite to that shown by the arrows 170, the thermoelectric heat pumps 161 and 162 cool and heat the elements 158 and 159, respectively, causing the elements 158 and 159 to be placed in their low and high permeability states, respectively. Under these circumstances, the core 156 moves to its rightmost position where it is held firmly against the right vertical arm 153 by the large attractive forces between the arm 153 and the right core section 156B.

The force with which the core 156 is held in either its leftmost or rightmost position is dependent upon the current through the winding 151. The position to which the core 156 is driven, that is, to the leftmost position or to the rightmost position, is determined by the direction of the current through the thermoelectric heat pumps 161 and 162. Since the current in the winding 151 may be made very large, and since the current through the thermoelectric heat pumps 161 and 162 is quite small, it is readily apparent that the device of FIG. 9 serves as an amplifier in the sense that a very small current flowing in lines 164–166 can be used to control the direction of displacement of a very large force between the core 156 and the arms 152 and 153, the exact magnitude of the force controlled being dependent upon the ampere-turns in the winding 151. By mechanically connecting the core 156 to some external device, such as the latch of a large bank vault door, it is possible, by using only the small force necessary to operate the double-pole double-throw switch 168, to control the movement of a rather massive vault latch.

Having described the invention, what is claimed is:

1. A magnetic device comprising:
structure providing a first flux path segment therethrough of high permeability, said structure having spaced first and second poles providing therebetween a second flux path segment of low permeability;
a winding magnetic flux-linked to said path segments and connectable to conduct current;
a movable member of high permeability in said second path segment having a central section disposed between first and second end sections located adjacent said first and second poles;
first and second elements having a permeability characterized by a sharp transition within a narrow temperature range, said first and second elements being disposed in said second path segment to magnetically shunt said first and second end sections of said movable member, respectively, and shift said movable member toward said first and second poles, respectively, when the temperature of said first and second elements, respectively, places said respective elements in high and low permeability states, respectively, and the current level in said winding is below a specified level.

2. The device of claim 1 further including selectively operable means to alternatively (a) place said first and second elements in their low and high permeability states, respectively, or (b) place said first and second elements in their high and low permeability states, respectively, thereby alternatively shifting said movable member toward said second and first poles, respectively.

3. The device of claim 2 wherein said selectively operable means includes first and second thermoelectric heat pump means positioned in heat transfer relation to said first and second elements, respectively, and a current source for alternatively (a) simultaneously causing said first and second elements to absorb and generate heat, respectively, or (b) simultaneously causing said first and second elements to generate and absorb heat, respectively.

4. A magnetic device comprising:
structure providing a first flux path segment therethrough of high permeability, said structure having spaced first and second poles providing therebetween a second flux path segment of low permeability;
a winding magnetic flux-linked to said path segments and connectable to conduct current;
a movable member of high permeability in said second path segment having a first section located adjacent said first pole unsaturable at a specified winding current level, and a second section located adjacent said second pole saturable at said specified winding current level to thereby shift said movable member toward said first pole; and
an element having a permeability characterized by a sharp transition within a narrow temperature range, said element being disposed in said second path segment to magnetically shunt said saturable section of said movable member and shift said movable member toward said first pole when the temperature of said element places it in a high permeability state and the current level in said winding is below said specified level.

5. The device of claim 4 wherein one of said movable member and said element has a cavity therein and wherein the other of said element and movable member projects into said cavity, said cavity extending the length of said second saturable section and a portion of said first unsaturable section located proximate said second saturable section, thereby magnetically shunting said second saturable section when the temperature of said element places it in a high permeability state and the current level in said winding is below said specified level.

6. The device of claim 4 wherein said movable member has a third section unsaturable at said specified current located intermediate said second section and said second pole to increase the attractive force between said second pole and said movable member when said winding current is below said specified level and the temperature of said element places it in a low permeability condition.

7. The device of claim 4 wherein said movable member has a cavity therein extending through said saturable section into said unsaturable section, and wherein said element projects into said cavity through said saturable section into said unsaturable section to magnetically shunt said saturable section when the temperature of said element places it in a high permeability state and the current level is below said specified level.

8. The device of claim 4 wherein said movable member is of substantially uniform permeability in a direction parallel to an imaginary line connecting the poles and wherein the cross-sectional area of said first section exceeds the cross-sectional area of said second section.

9. The device of claim 8 wherein said movable member has a third section having a cross-sectional area which exceeds the cross-sectional area of said second section and which is located intermediate said second section and said second pole to increase the attractive force between said second pole and said movable member when said winding current is below said specified level and the temperature of said element places it in a low permeability condition.

10. A magnetic device comprising:

structure providing a first flux path segment therethrough of high permeability, said structure having spaced first and second poles providing a second flux path segment of low permeability;

a winding magnetic flux-linked to said path segments and connectable to conduct current;

a movable member in said second path segment having a uniformly high permeability in a direction parallel to an imaginary line connecting said poles, said member having a groove therein in a plane traversing said line and a cavity therein parallel to said line which is open to said second pole and extends beyond said groove in a direction toward said first pole, the movable member being saturable at said plane at current levels above a specified level to shift said movable member toward said first pole; and an element in said second path having a permeability characterized by a sharp transition within a narrow temperature range, said element projecting into said cavity through said plane to magnetically shunt said saturable member section when said temperature of said element places it in a high permeability state and said current is below said specified level.

11. A magnetic device comprising:

structure defining a first flux path segment therethrough of high permeability, said structure having spaced first and second poles providing therebetween a second flux path segment of low permeability;

a core of high permeability located in said low permeability path segment and movable in said low permeability path segment relative to said poles, said core having a first section located closely adjacent said first pole and a second section fixed relative to said first section and spaced from said second pole to form a variable length air gap therebetween as said core moves between said poles;

a winding flux-linked to said core and structure for establishing a flux flow therethrough;

said first section of said core having a permeability characterized by a sharp transition within a narrow temperature range for producing a substantial change in magnetic flux in said gap to thereby shift said core toward said second pole in response to a change in temperature of said element through said specified range.

12. The magnetic device of claim 11 wherein said first and second core sections and said structure are in series magnetic circuit arrangement.

13. The device of claim 11 further including first and second electrical contacts fixed relative to different ones of said structure and said movable core, and electrically connectable to each other in series circuit arrangement with said winding to permit current flow in said winding except when said movable member moves in response to high and low current levels when the temperature of said element is below and above said specified temperature, respectively.

14. The magnetic device of claim 12 further including first and second electrical contacts fixed relative to different ones of said structure and said movable core, and electrically connectable to each other in series circuit arrangement with said winding to permit current flow in said winding except when said movable member moves in response to high and low current levels when the temperature of said element is below and above said specified temperature, respectively.

15. The device of claim 11 further including means to hold said second core section away from said second pole except (a) when said temperature of said first core section places said first core section in said high permeabilty condition and current in said winding is below a first value, or (b) when said current in said winding exceeds said first value.

16. The device of claim 12 further including means to hold said second core section away from said second pole except (a) when said temperature of said first core section places said first core section in said high permeability condition and current in said winding is below a first value, or (b) when said current in said winding exceeds said first value.

17. The device of claim 12 wherein the length of said gap and said element in a direction parallel to the flux flow in said gap and element, respectively, are substantially equal.

18. The device of claim 12 wherein said winding surrounds said first core section.

19. A magnetic device comprising:

a core of high permeability;

an element in magnetic circuit with said core and having a permeability characterized by a sharp transition within a narrow temperature range;

a high permeability movable member in magnetic series circuit arrangement with said element when said element is in both said high and low permeability conditions, said member being movable toward and away from said element to establish a variable gap therebetween in response to changes in the temperature of said element which place said element in different ones of said high and low permeability conditions, structure mounting said movable member for movement, said structure defining a return flux path for said core, element, and movable member, and a winding flux linked to said core and element for establishing a flux flow therethrough upon flow of current through said winding, said winding having a central cavity communicating at one end with said gap, said thermomagnetic element being located in said cavity to thereby enhance the heat transfer between said winding and said element, said thermomagnetic element being further located in said cavity at said one end thereof proximate said gap to enhance, when said element changes between high and low permeability conditions, the change in attractive force on said movable member per unit of thermomagnetic material of said element.

20. The device of claim 19 wherein the length of said gap and said element in a direction parallel to the flux flow in said gap and element, respectively, are substantially equal.

21. The device of claim 19 wherein said winding surrounds said element.

22. The device of claim 19 further including bias means connected to said movable member to normally hold said movable member away from said core and element, said bias means being overcome to permit said movable member to move toward said element (a) when temperature of said element places said element in said high permeability condition and said current in said winding is below a first value, or (b) when said current in said winding exceeds said first value.

References Cited

UNITED STATES PATENTS

| | | | |
|---|---|---|---|
| 2,255,638 | 9/1941 | Armstrong | 335—146 |
| 2,781,433 | 2/1957 | Wilchens | 335—146 |
| 3,206,573 | 9/1965 | Anderson et al. | 335—146 X |

BERNARD A. GILHEANY, Primary Examiner

R. N. ENVALL, Jr., Assistant Examiner

U.S. Cl. X.R.

335—208